United States Patent [19]

Schurger et al.

[11] 3,955,857

[45] May 11, 1976

[54] BALL BOX

[75] Inventors: Rainer Schurger, Schwanfeld; Lothar Walter, Schweinfurt; Erich Burkl, Stammheim, all of Germany

[73] Assignee: SKF Industrial Trading and Development Company, B.V., Jutphaas, Netherlands

[22] Filed: Dec. 6, 1974

[21] Appl. No.: 530,382

[30] Foreign Application Priority Data

Jan. 11, 1974  Germany.............................. 2401225

[52] U.S. Cl................................................. 308/6 C
[51] Int. Cl.².......................................... F16C 17/00
[58] Field of Search................ 308/6 R, 8, 6 C, 239

[56] References Cited

UNITED STATES PATENTS

| 3,547,502 | 12/1970 | Howard | 308/6 C |
| 3,563,616 | 2/1971 | Allen | 308/6 C |
| 3,719,979 | 3/1973 | Irwin | 308/6 C |

Primary Examiner—John J. Love
Attorney, Agent, or Firm—Daniel M. Rosen

[57] ABSTRACT

A ball box construction including a cage for guiding several continuous ball races along a loaded zone and a load-free zone, the cage being provided with a plurality of inserts formed as metal clips each having a loaded zone race portion and an unloaded zone race portion. the two portions made integral at a respective end thereof by a connecting piece.

11 Claims, 9 Drawing Figures

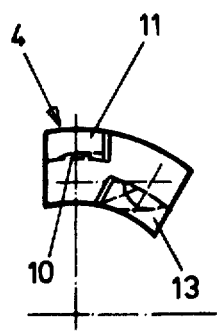
Fig. 9
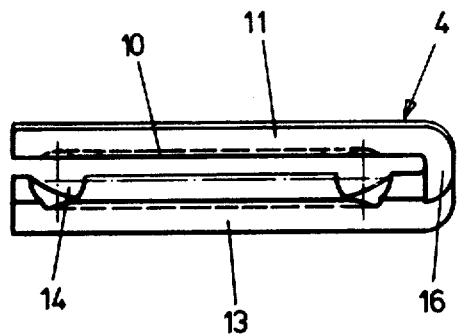
Fig. 8
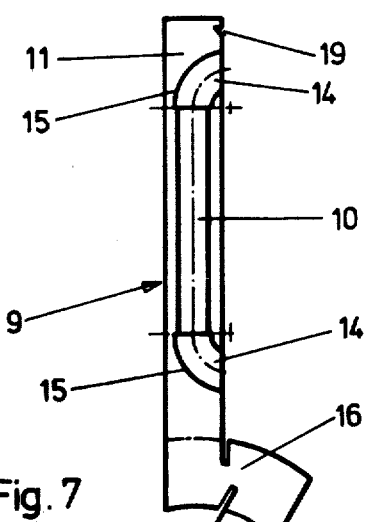
Fig. 7
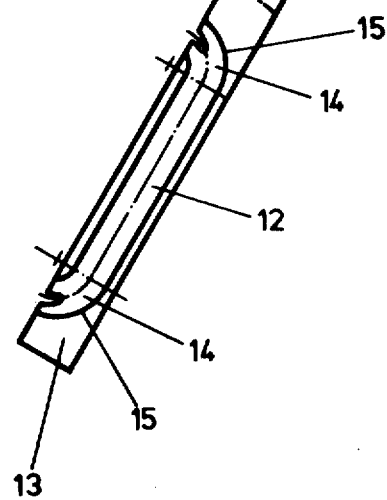

BALL BOX

THE INVENTION

The invention relates to bearing ball boxes, and particularly to a ball box with a cage for the guidance of balls of several continuous ball races.

In bearing ball box constructions, each of the balls of the several races project radially inward from a longitudinal slit in the cage in the zone under load. The balls roll also the opposite races of steel race inserts in an axial direction. Each race in the frontal region is connected to a return channel in the load-free zone of the cage by reversing zones.

Such ball box constructions of this type are known. The reversing zones and return channels are incorporated in a plastic cage, and thus the balls do not roll on steel races in this area. As a result, the life expectancy of such a conventional ball box construction is not very high. Furthermore, the cage has a relatively complex shape in the region of the races and the return channels, so that radial sliders are required for production.

It is thus the object of the present invention to construct a ball box with a higher life expectancy than known heretofore, but which is nevertheless simpler to manufacture.

The invention is realized in accordance with the foregoing object by constructing a ball box, of the type described above, with each return channel terminated in a radially inward direction by a race insert carrying a race. The race insert is formed as a steel clip and made integral with the associated race insert of the zone under load by means of a connecting piece at one face thereof. The races of the reversing zones are preferably incorporated into the steel clip.

The steel clip required for each continuous ball race can be shaped from a flat stamped part, after impression of the races, by simple bending. Since both the races of the return channels and those of the reversing zones are formed in the steel clip, the life expectancy of the ball box according to the invention is increased as compared with known embodiments.

In a further development of the invention, the cage is formed as a ridge cage and the steel clips are inserted into the recesses between two cross-pieces of the cage with the connecting pieces embracing the free ends of the cross-pieces. The ridge cage required for this purpose does not require any great expenditure during manufacture, because radial sliders are not required for the molding of races. The shaping tools required for the recesses between the cross-pieces of the cage can be withdrawn after use in an axial manner.

Additional characteristics and advantages of the invention will be apparent from the following more detailed description, taken in conjunction with the appended drawings, wherein:

FIG. 7 is a view of the steel clip used in the ball box according to the invention in the stamped, but not yet bent state;

FIG. 8 is a view of the steel clip shown in FIG. 7 in the bent state; and

FIG. 9 is a front view of the steel clip shown in FIG. 8.

Figure 1:
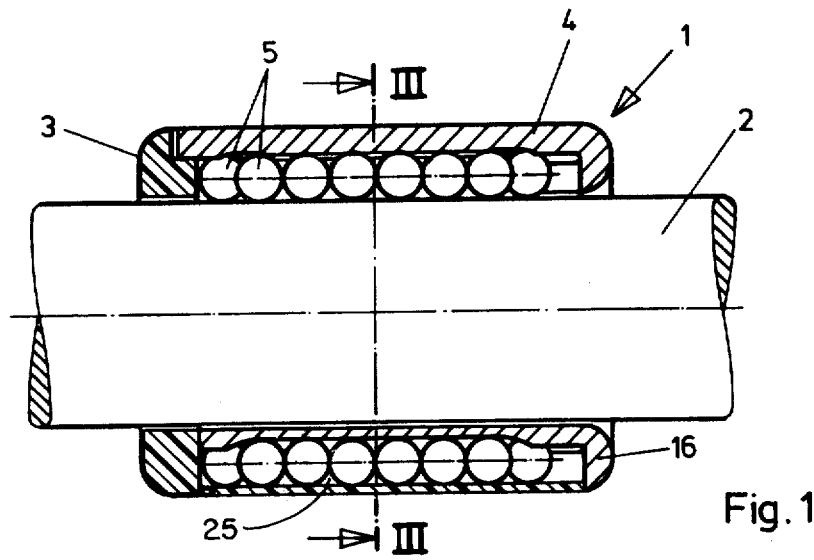
FIG. 1 is a longitudinal section through a ball box according to the invention.
Figure 2:
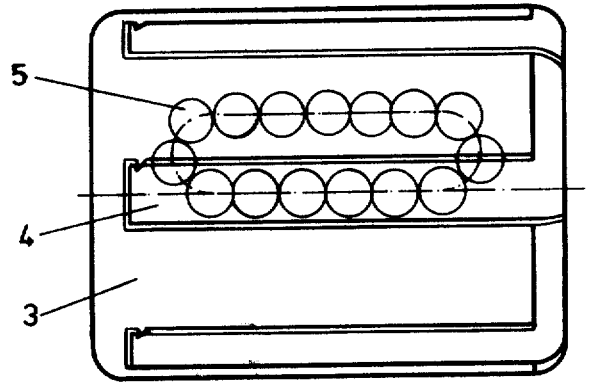
FIG. 2 is a top view of the ball box according to FIG. 1.
Figure 3:
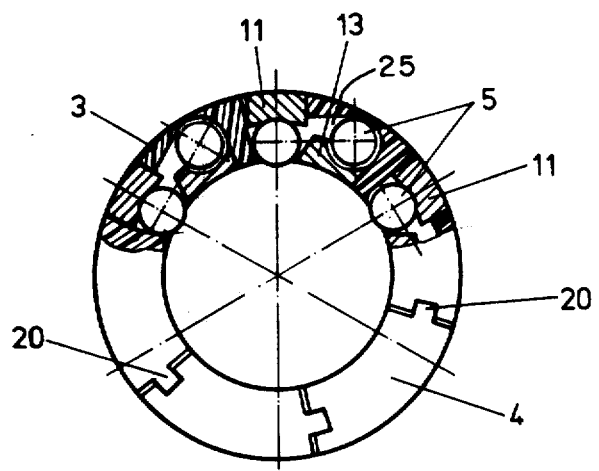
FIG. 3 is a cross-section along the line III—III of FIG. 1, without the shaft.

As can be seen from FIGS. 1 through 3, the ball box 1 according to the invention, which is axially displaceable relative to a shaft 2, consists of a plastic cage 3 and steel clip 4 and balls 5 inserted therein.

Figure 4:
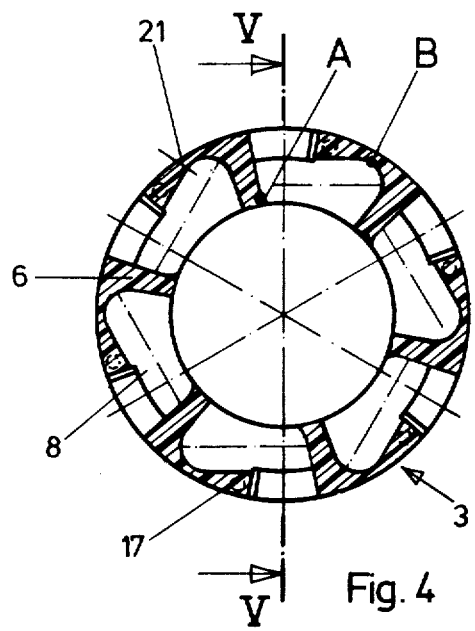
FIG. 4 is a cross-section through the cage of the ball box shown in FIGS. 1-3.
Figure 5:
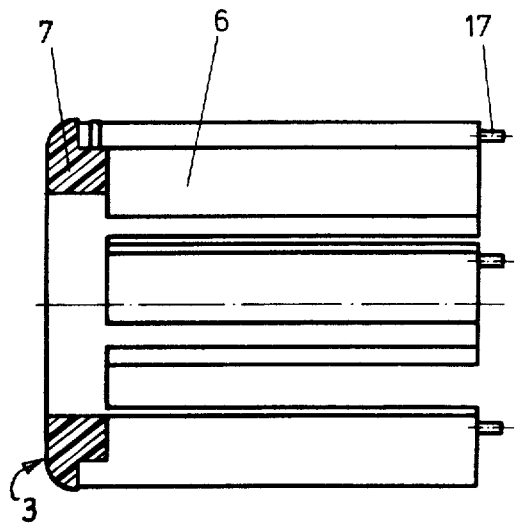
FIG. 5 is a section along the line V—V of FIG. 4.
Figure 6:
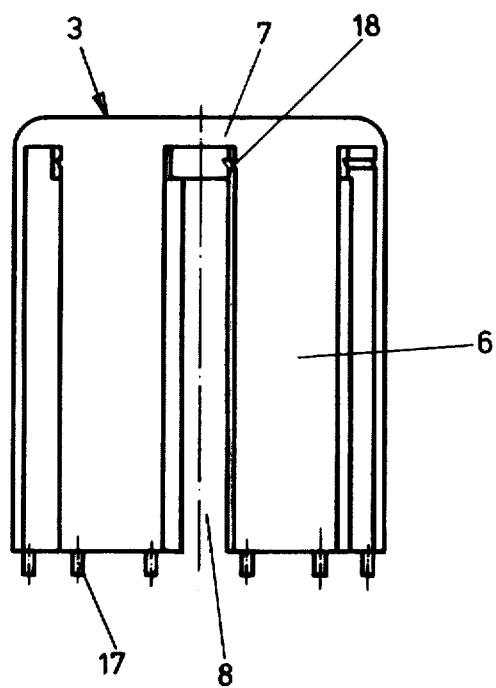
FIG. 6 is a top view of the cage shown in FIGS. 4 and 5.

The cage 3 is shown in greater detail in FIGS. 4 through 6. The individual, axially proceeding cross-pieces 6 of the cage 3 are connected to each other at one face by a ring 7. As a result, the cage 3 is made in the form of a ridge cage. The steel clips 4, which are shown in FIGS. 7 through 9, are inserted into the recesses 8 of the cage 3.

As shown in FIG. 7, each of the steel clips 4 can be made from a flat stamped metal part 9. For this purpose, the race 10 for the race insert 11 of the zone under load, the race 12 for the race insert 13 of the load-free zone, and the races 14 of the two reversing zones 15 are impressed into the stamped metal part 9. The two race inserts 11 and 13 are connected to each other by means of a connecting piece 16. After impression of the races 10, 12 and 14, the flat stamped metal part 9 is bent through 90° at each of the broken lines of the connecting piece 16, so that the steel clip shown in FIGS. 8 and 9 is formed.

One of these steel clips 4 is pushed axially into each of the recesses 8 of the cage 3. The connecting pieces 16 embrace the free ends of the cross-pieces 6. The free ends of the cross-pieces 6 are attached to the connecting pieces 16 by means of pegs 17, made integral with the cross-pieces 6, which engage with corresponding holes (not shown) of the connecting pieces 16. Furthermore, protrusions 18 are formed on the cross-pieces 6 to engage with corresponding indentations 19 axially fixing the steel clips 4.

As is shown further in FIG. 3, the steel clips 4 can have projections 20 on their longitudinal sides in the region of the connecting pieces 16. The projections 20 engage with corresponding grooves on the adjacent connecting pieces 16 for radially fixing the steel clips 4 to each other.

The final assembly of the ball box 1 according to the invention has the advantage that every return channel 25 is defined in a radial inward direction by a steel race insert 13, which carries the race 12 for the balls 5 in the load-free zone. Furthermore, the balls 5 also run on steel races 14 in the reversing zones 15, as a result of which the life expectancy of the ball box 1 is relatively long. The balls 5, which can be introduced through an opening 21 outside the points of contact between the balls 5 and cage 3, are in contact with the cage 3 only at points A and B (FIG. 4).

In a modification of the embodiment of the cage 3 according to FIG. 4, it is also possible to make the cage open in a radially outward direction in the region of the load-free zone, that is, at the return channels.

Finally, it is indicated in FIG. 9 (as shown by the broken lines) that the race insert 13 provided for the load-free zone can be made bevelled in order to thereby reduce the stamping forces during production.

Further variations, substitutions and modifications within the spirit and scope of the invention will be apparent to those skilled in the art.

What is claimed is:

1. A ball box construction, comprising a cage for the guidance of balls of several continuous ball races, a plurality of balls, and a plurality of steel race inserts having first and second races formed therein and assembled in said cage, said balls projecting radially inward from the cage in the zone under load, said race inserts being positioned with their first races radially outward of the balls in the zone under load, whereby said balls roll on said first races of said steel race inserts in an axial direction, each race in the zone under load being connected to a return channel in the load-free zone of the cage by reversing zones, each return channel being defined in a radially inward direction by a second race of a race insert, said race inserts comprising steel clips having connecting pieces at one face inter-connecting the respective first and second races.

2. The ball box of claim 1, wherein the reversing zone races are formed in said steel clip.

3. The ball box of claim 1, wherein said steel clip is inserted into recesses formed between first and second cross-pieces of said cage, said cage being formed as a ridge cage, and said connecting piece embracing the free ends of said cross-pieces.

4. The ball box of claim 3, wherein said free ends of said cross-pieces are attached to said connecting pieces by means of pegs.

5. The ball box of claim 3, wherein the free ends of said steel clips are axially fixed to said cage cross-pieces by means of protrusions.

6. The ball box of claim 1, wherein said steel clips, in the region of said connecting pieces, are connected to each other by means of projections on the longitudinal side thereof which engage with corresponding grooves of the adjacent connecting piece for the purpose of radial fixation.

7. A ball box construction comprising a cage for guiding several continuous ball races along a loaded zone and a load-free zone along a first race and second race, respectively, and a return path along a return race joining said first and second races, and a plurality of elongated metal inserts, said inserts each having a loaded zone race formed on a first portion thereof, an unloaded zone race formed on a second portion thereof and a connecting portion joining said first and second portions, each of said portions further including a return race formed thereon, said elongated metal inserts being bent over in a clip shape and inserted into said cage at spaced circumferential intervals.

8. The ball box of claim 7 wherein said cage includes a plurality of ridges formed along the length thereof and defining and separating pluralities of recesses formed in said cage for respective ball races, said metal inserts being inserted into a respective recess such that each said connecting portion engages a free end of a crosspiece defined by an end of said ridge.

9. The ball box of claim 8, wherein said free ends of said cross-pieces are attached to said connecting pieces by means of pegs.

10. The ball box of claim 8, wherein the free ends of said steel clips are axially fixed to said cage cross-pieces by means of protrusions.

11. The ball box of claim 8, wherein said steel clips, in the region of said connecting pieces, are connected to each other by means of projections on the longitudinal side thereof which engage with corresponding grooves of the adjacent connecting piece for the purpose of radial fixation.

* * * * *